(12) United States Patent
Grant

(10) Patent No.: US 6,422,786 B1
(45) Date of Patent: Jul. 23, 2002

(54) AIR-COOLED GEARBOX ASSEMBLY

(75) Inventor: Steven D. Grant, Richfield, WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 09/494,871

(22) Filed: Jan. 31, 2000

(51) Int. Cl.[7] .......................... B60K 11/00; E01C 19/22
(52) U.S. Cl. ...................................... 404/112; 180/68.1
(58) Field of Search .................... 404/112; 180/68.1, 180/68.2, 68.4, 68.6

(56) References Cited

U.S. PATENT DOCUMENTS

| 3,962,934 | A | * | 6/1976 | Boutin | 74/752 |
| 4,074,590 | A | * | 2/1978 | Jorg | 74/606 |
| 4,164,262 | A | * | 8/1979 | Skatsche et al. | 180/54 |
| 4,241,666 | A | * | 12/1980 | Marcusson et al. | 105/59 |
| 5,765,656 | A | * | 6/1998 | Weaver | 180/65.3 |
| 5,967,696 | A | * | 10/1999 | Allen et al. | 404/112 |

OTHER PUBLICATIONS

"Power Trowels for the Professional," M–B–W Inc. brochure, undated.

* cited by examiner

Primary Examiner—Thomas B. Will
Assistant Examiner—Raymond W Addie
(74) Attorney, Agent, or Firm—Boyle Fredrickson Newholm Stein & Gratz S.C.

(57) ABSTRACT

An air-cooled gearbox assembly for a concrete finishing trowel or the like is configured to maximize its cooling efficiency so as to negate the need to oversize the gearbox of the assembly. The assembly includes an air cooler including vertical fins on the gearbox and a blower. A shroud on the blower interacts with the fins on the gearbox to channel air vertically onto and over the upper and lower surfaces of the gearbox. The shroud also seals against the side edges of the gearbox to prevent the air from short-circuiting airflow passages formed between the fins. The airflow patterns resulting from this arrangement maximize convective heat transfer, thus maximizing cooling efficiency. The gearbox's thermal capacity is therefore considerably enhanced. As a result (all other things being equal), a much lighter gearbox can be used in a given application than otherwise would be required. Weight savings of more than 40% can be expected.

19 Claims, 5 Drawing Sheets

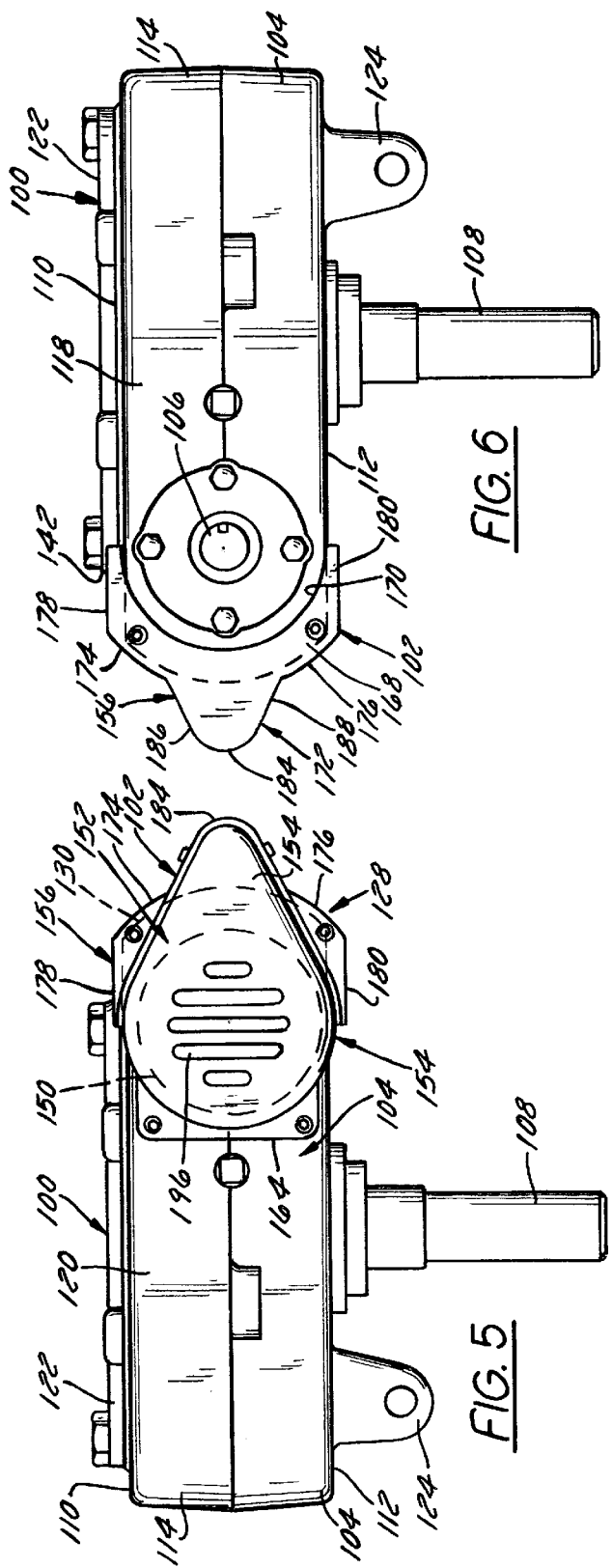
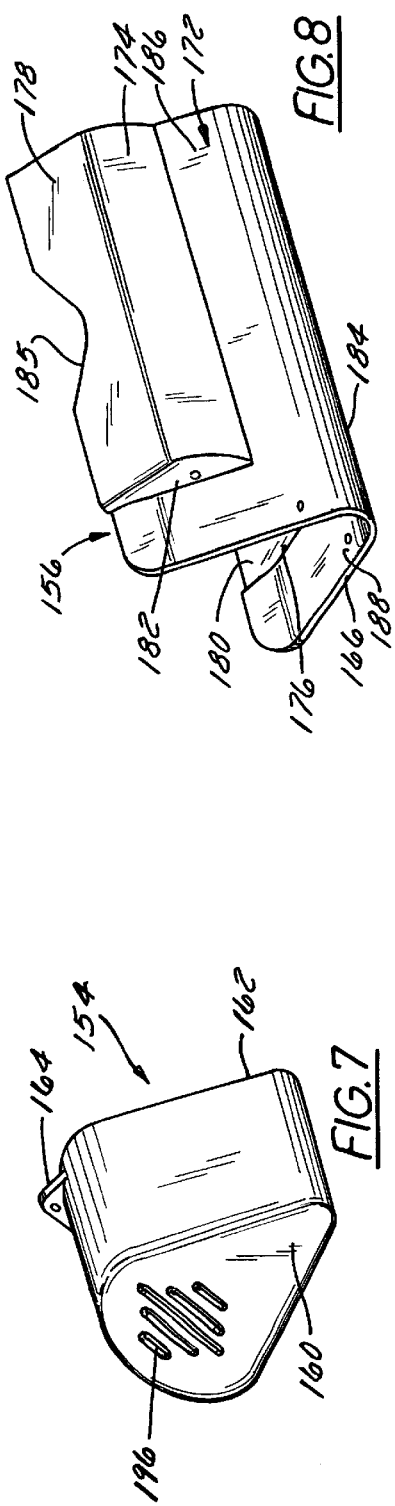

AIR-COOLED GEARBOX ASSEMBLY

BACKGROUND OF THE INVENTION

1. Field of the Invention

The invention relates to gearboxes used to drive rotating shafts and, more particularly, relates to an air-cooled gearbox assembly usable, e.g., to drive a rotor assembly of a concrete finishing trowel.

2. Description of the Related Art

Gearboxes are used to transfer torque to rotating shafts in a variety of environments in which the gearbox must be cooled to prevent it from overheating. One such application is a riding concrete finishing trowel. Riding finishing trowels can finish large sections of concrete more rapidly and efficiently than manually pushed finishing trowels. The typical machine of this type includes a mobile frame having a deck that supports an operator's platform. At least two, and sometimes three or more, rotor assemblies are mounted on an underside of the deck. Each rotor assembly includes a driven shaft extending downwardly from the deck and a plurality of trowel blades. The trowel blades extend radially outwardly from the bottom end of the driven shaft and support the machine on the surface to be finished. In use, the weight of the finishing trowel and the operator is transmitted frictionally to the concrete by the rotating blades, thereby smoothing the concrete surface. The individual blades usually can be tilted relative to their supports to alter the pitch of the blades, and thereby to alter the pressure applied to the surface to be finished by the weight of the machine. In addition, the rotor assemblies are tiltable for steering purposes.

The driven shafts of the rotor assemblies are driven by one or more self-contained engines that are mounted on the frame and that are linked to the driven shafts by gearboxes. Each gearbox includes a housing tiltably mounted on the frame, an input shaft extending horizontally from the housing, and an output shaft extending vertically downwardly from the housing and coupled to the driven shaft of the rotor assembly. The input shaft is coupled to the output shaft by internal gears that are lubricated by a liquid lubricant.

The typical gearbox generates substantial heat during operation and must be cooled to prevent its lubricant from overheating and breaking down. Some gearboxes are air-cooled by a blower that is mounted on an end of the gearbox housing. The blower forces air laterally across the end of the housing without diverting the air over or under the gearbox. This airflow pattern results in relatively ineffective cooling because the most critical surfaces of the housing are not subjected to convective forced air heat transfer. The gearbox therefore must be oversized to prevent it from overheating. This oversizing requirement results in unnecessary weight and expense.

OBJECTS AND SUMMARY OF THE INVENTION

It is therefore a first principal object of the invention to provide an air-cooled gearbox assembly having an enhanced thermal capacity when compared to traditional air-cooled gearboxes.

Another object of the invention is to provide a gearbox assembly that meets the first principal object of the invention and that incorporates an improved cooling arrangement.

In accordance with a first aspect of the invention, these objects are achieved by providing an air-cooled gearbox assembly comprising a gearbox and an air cooler. The gearbox includes an input shaft, an output shaft, and a housing. The housing has upper and lower surfaces, an end wall which extends between the upper and lower surfaces, and inboard and outboard sidewalls which flank the end wall. The air cooler is configured to deflect air flowing along the end wall of the housing over at least one of the upper and lower surfaces of the housing. It comprises a blower and a plurality of spaced fins which are disposed on the end wall of the housing.

Preferably, the blower comprises an impeller and a shroud which houses the impeller and which overlies the fins. The shroud and the fins form airflow passages that extend between the fins to at least one of the upper and lower surfaces of the housing.

As a result of the increased thermal capacity achieved using this arrangement, a gearbox that weighs less than 50 lbs can be rated for a gearbox output speed of 200 rpm at an input speed of 4,000 rpm when driven by a 10–15 hp input.

Another principal object of the invention is to provide an improved method of cooling an air-cooled gearbox.

In accordance with another aspect of the invention, this object is achieved by forcing air at least generally horizontally across an end wall of a gearbox housing, and deflecting at least a substantial portion of the air at least generally vertically along the end wall and onto at least one of upper and lower surfaces of the housing, thereby cooling the at least one surface.

In order to prevent air from short-circuiting cooling passages of the gearbox assembly, measures are preferably taken for at least substantially preventing air from flowing past the sidewalls of the housing.

In addition, the deflecting step preferably comprises deflecting the air both upwardly and downwardly from a horizontal parting line on the end wall in order to effectively cool both the upper and lower surfaces of the gearbox.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 5 is a right side elevation view of the gearbox assembly;

FIG. 6 is a left side elevation view of the gearbox assembly;

FIG. 7 is perspective view of an impeller housing section of the shroud of the gearbox assembly;

FIG. 8 is a perspective view of an air directing section of the shroud of the gearbox assembly;

DETAILED DESCRIPTION OF THE PREFERRED EMBODIMENT

1. Resume

Pursuant to a preferred embodiment of the invention, an air-cooled gearbox assembly for a concrete finishing trowel or the like is configured to maximize its cooling efficiency so as to negate the need to oversize the assembly's gearbox. The gearbox is cooled by a cooler including a blower and vertical fins on the gearbox. A shroud on the blower interacts with the fins on the gearbox to channel air vertically onto and over the upper and lower surfaces of the gearbox. The shroud also seals against the side edges of the gearbox to prevent the air from short-circuiting vertical airflow passages formed between the fins. The airflow patterns resulting from this arrangement maximize convective heat transfer, thus maximizing cooling efficiency. The gearbox's thermal capacity is therefore considerably enhanced. As a result (all other things being equal), a much lighter gearbox can be used in a given application than otherwise would be required. Weight savings of 40% or more can be expected.

2. System Overview

The present invention is applicable to any application in which it is desirable to cool the exterior of a gearbox to prevent it from overheating. Hence, while the invention is described herein primarily in conjunction with a riding finishing trowel, it is not so limited.

Figure 1:
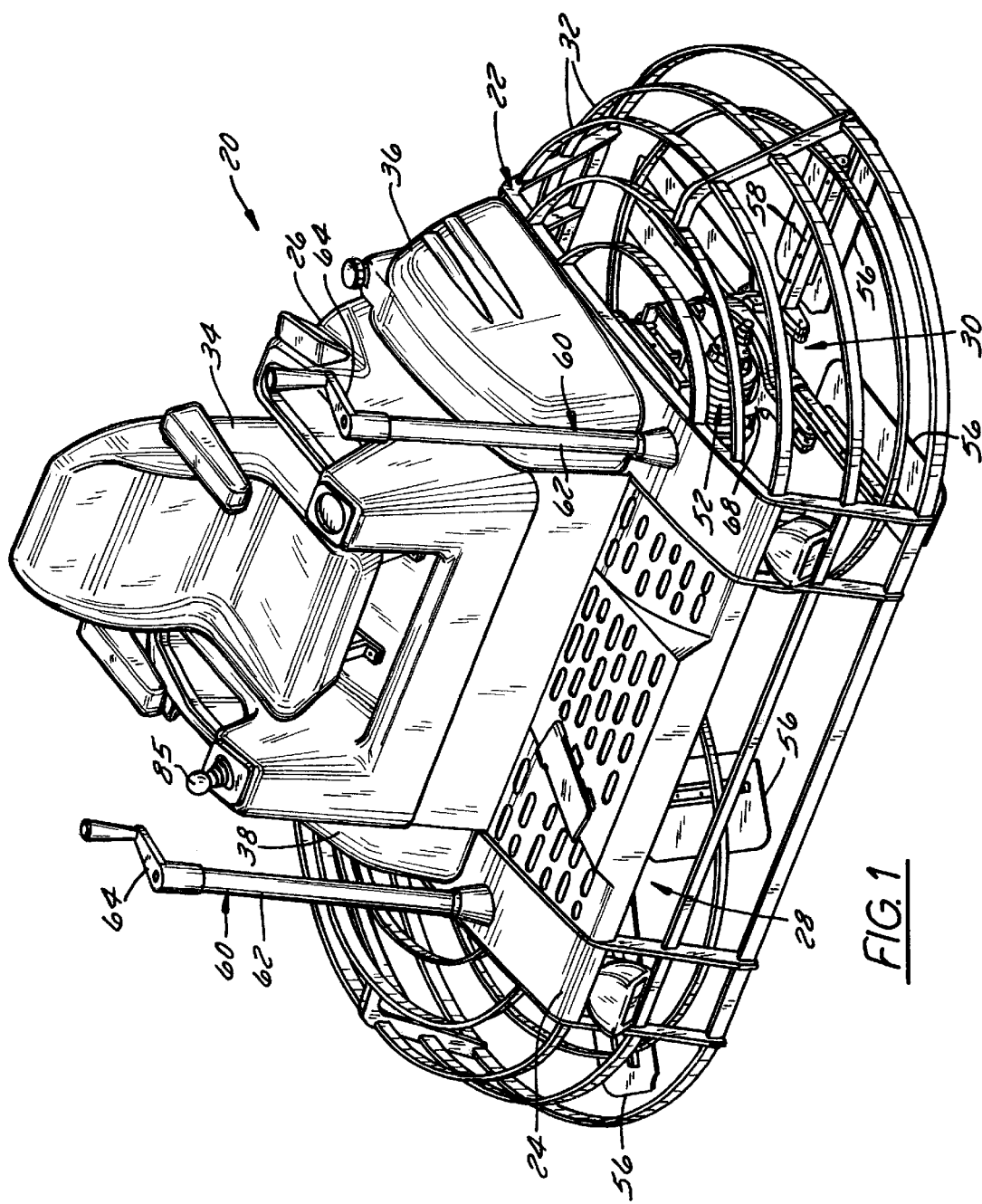
FIG. 1 is a perspective view of a riding concrete finishing trowel incorporating an air-cooled gearbox assembly constructed in accordance with a preferred embodiment of the invention.
Figure 2:
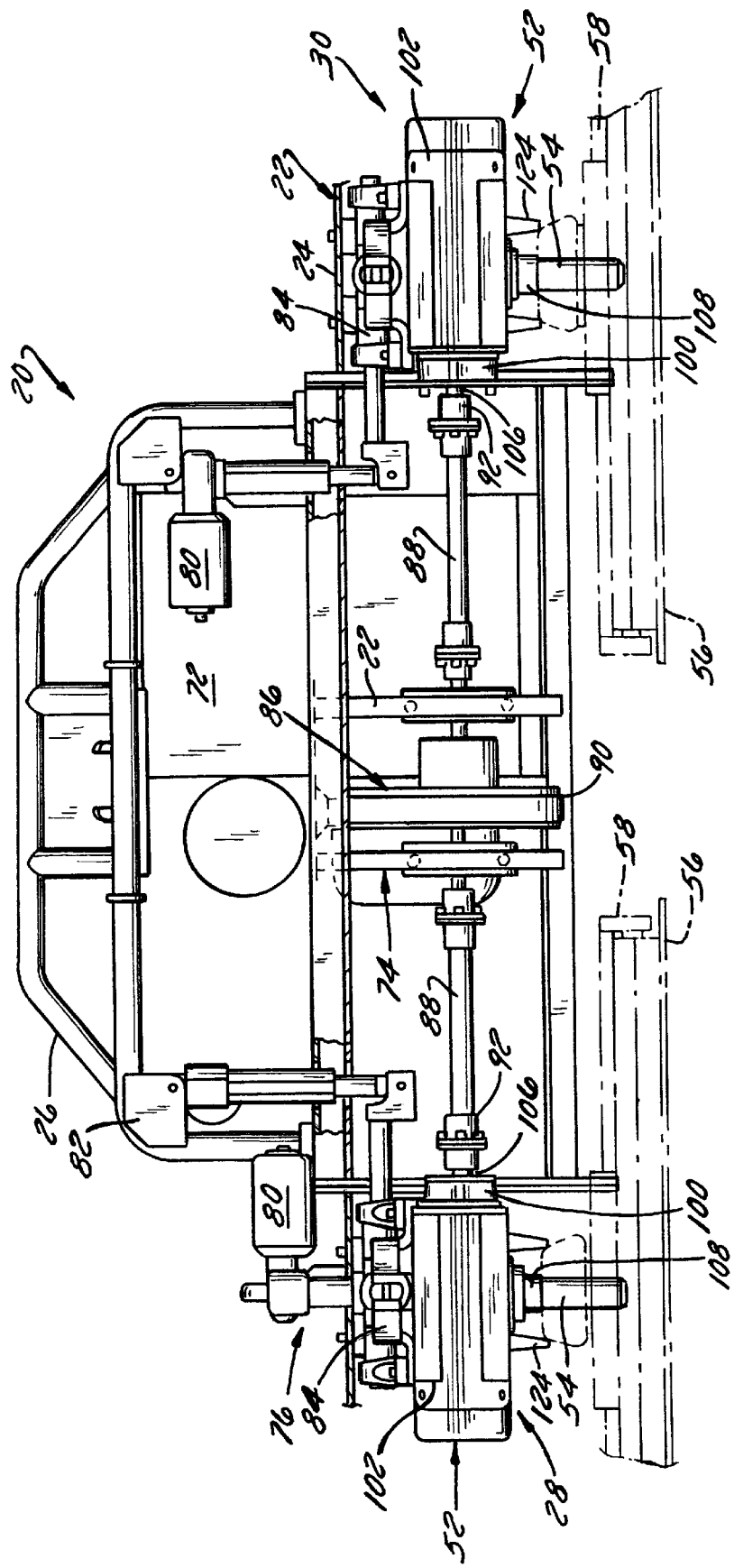
FIG. 2 is a fragmentary sectional front elevation view of the finishing trowel of FIG. 1.

Referring now to FIGS. 1 and 2, a riding concrete finishing trowel 20 incorporating a gearbox assembly constructed in accordance with a preferred embodiment of the invention is illustrated. Trowel 20 includes a rigid metallic frame 22, an upper deck 24 mounted on the frame, and an operator's platform or pedestal 26 mounted on the deck 24. A conventional ring guard 32, positioned at the outer perimeter of the machine 20, extends downwardly from the deck 24 to the vicinity of the surface to be finished. The pedestal 26 is positioned longitudinally centrally on the deck 24 at a rear portion thereof and supports an operator's seat 34. The pedestal 26 and seat 34 can be pivoted via hinges (not shown) to permit access to components of the machine located thereunder, such as the machine's engine 72. A fuel tank 36 is disposed adjacent the left side of the pedestal 26, and a water retardant tank 38 is disposed on the right side of the pedestal 26 and overlies one of the actuators 86 of a steering system 76 detailed below. Rotor assemblies 28 and 30 extend downwardly from the deck 24 to support the finishing machine 20 on the surface to be finished. The rotor assemblies 28 and 30 rotate towards the operator, or counterclockwise and clockwise, respectively, to perform a finishing operation.

Still referring now to FIGS. 1 and 2, each-rotor assembly 28, 30 includes a gearbox assembly 52, a driven shaft 54 extending downwardly from the gearbox assembly, and a plurality of circumferentially-spaced blades 56. The blades 56 are supported on the driven shaft 54 via radial support arms 58 and extend radially outwardly from the bottom end of the driven shaft 54 so as to rest on the concrete surface. Each gearbox 52 is mounted on the undersurface of the deck 24 so as to be tiltable about the deck 24 to steer the machine 20.

The pitch of the blades 56 of each of the rotor assemblies 28 and 30 can be individually adjusted by a dedicated blade pitch adjustment assembly, generally designated 60 in FIG. 1. Each blade pitch adjustment assembly 60 includes a generally vertical post 62 and a crank 64 which is mounted on top of the post 62 and which can be rotated by the operator to vary the pitch of the trowel blades 56 in a known manner. A power concrete finishing trowel having this type of blade pitch adjustment assembly is disclosed, e.g., in U.S. Pat. No. 2,887,934 to Whiteman, the disclosure of which is hereby incorporated by reference.

Both rotor assemblies 28 and 30, as well as other powered components of the finishing trowel 20, are driven by a power source such as a gasoline powered internal combustion engine 72 mounted under the operator's seat 34. The size of the engine 72 will vary with the size of the machine 20 and the number of rotor assemblies powered by the engine. The illustrated two-rotor, 48" machine typically will employ an engine of about 25 hp.

The rotor assemblies 28 and 30 can be tilted for steering purposes via a steering system 76. This system 76 is an electrically actuated system including electric actuators 80 and 82. The actuators 80 and 82 are coupled to the gearbox assemblies 52 by a lever assembly 84 and are controlled by a joystick 85 as described in greater detail in U.S. patent application Ser. No. 09/352,225, filed Jul. 13, 1999 in the name of Smith et al., the subject matter of which is hereby incorporated by reference by way of background.

The gearbox assemblies 52 of the rotor assemblies 28 and 30 are coupled to the engine 72 by a torque transfer assembly 74 that includes a torque converter 86 and a pair of flexible output shafts 88, each of which is coupled to an input shaft of a respective gearbox assembly 52. The torque converter 86 comprises a variable-speed clutch assembly including a driven clutch 90 whose speed varies with engine speed. The driven clutch 90 is coupled to both flexible shafts 88 via couplings 92, and the flexible shafts 88 are, in turn coupled to input shafts 106 of to the respective gearbox assemblies 52. A preferred torque transfer assembly 74 is described in greater detail in U.S. patent application Ser. No. 09/352,226, filed Jul. 13, 1999 in the name of Sartler et al., the subject matter of which is hereby incorporated by reference by way of background.

3. Construction of Gearbox Assembly

Both gearbox assemblies 52 essentially are identical to one another. The discussion that follows will therefore be limited to the gearbox assembly 52 of the rotor assembly 28, it being understood that essentially the same discussion is applicable to the gearbox assembly of the rotor assembly 30.

Referring generally to FIGS. 3–10, the gearbox assembly 52 includes a gearbox 100 and an air cooler 102 that is configured to efficiently cool the gearbox 100. The gearbox 100 includes a housing 104, an input shaft 106, and an output shaft 108 connected to the driven shaft 54 of the associated rotor assembly 28. The housing 104 is preferably from formed cast aluminum to reduce weight and to improve cooling efficiency. It has upper and lower surfaces 110, 112, rear and front end walls 114, 116 which extend between the upper and lower surfaces 110, 112, and inboard and outboard sidewalls 118, 120 which flank the end walls 114, 116. The input shaft 106 extends into the inboard sidewall 118 in the vicinity of the front end wall 116, and the output shaft 108 extends out of the lower surface 112 of the housing 104. An access plate 122 is bolted to the upper surface of the housing 104. Ear mounts 124 for the blade pitch adjust assembly 60 are cast onto the lower surface 112 of the housing 104.

Figure 3:
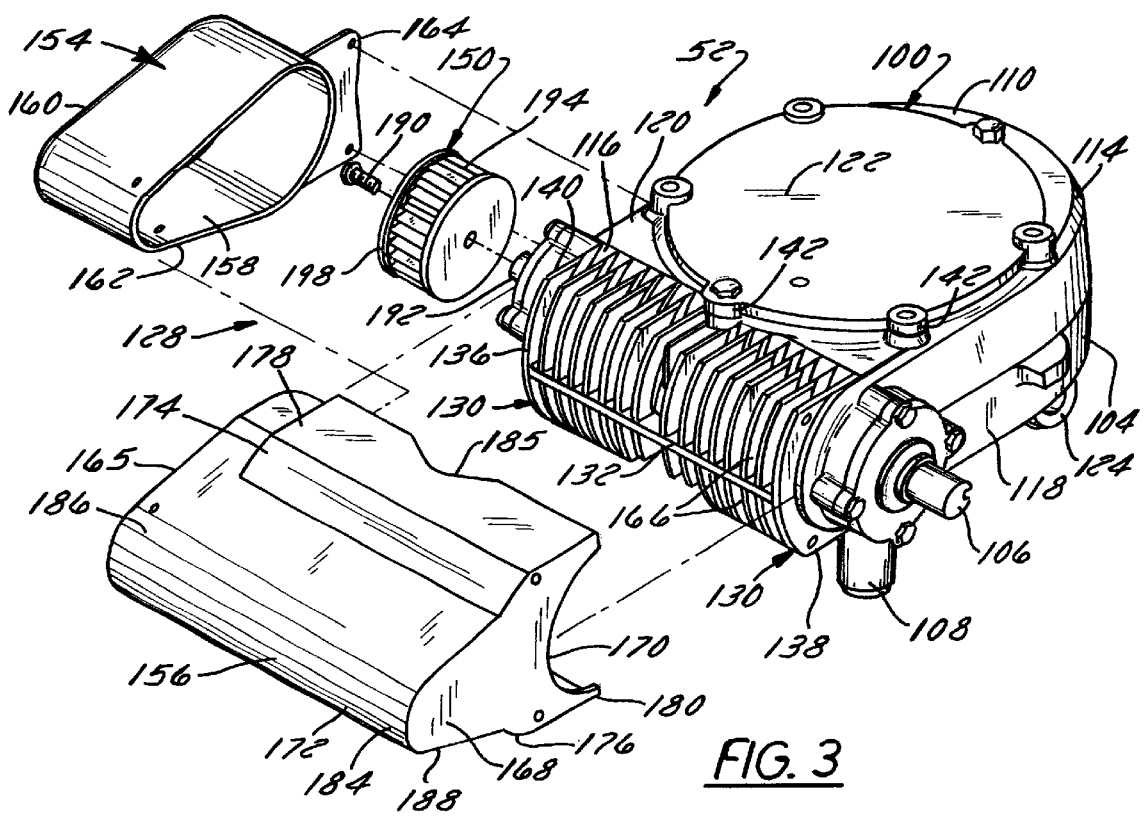
FIG. 3 is an exploded perspective view of a gearbox assembly of the finishing trowel of FIGS. 1 and 2.
Figure 4:
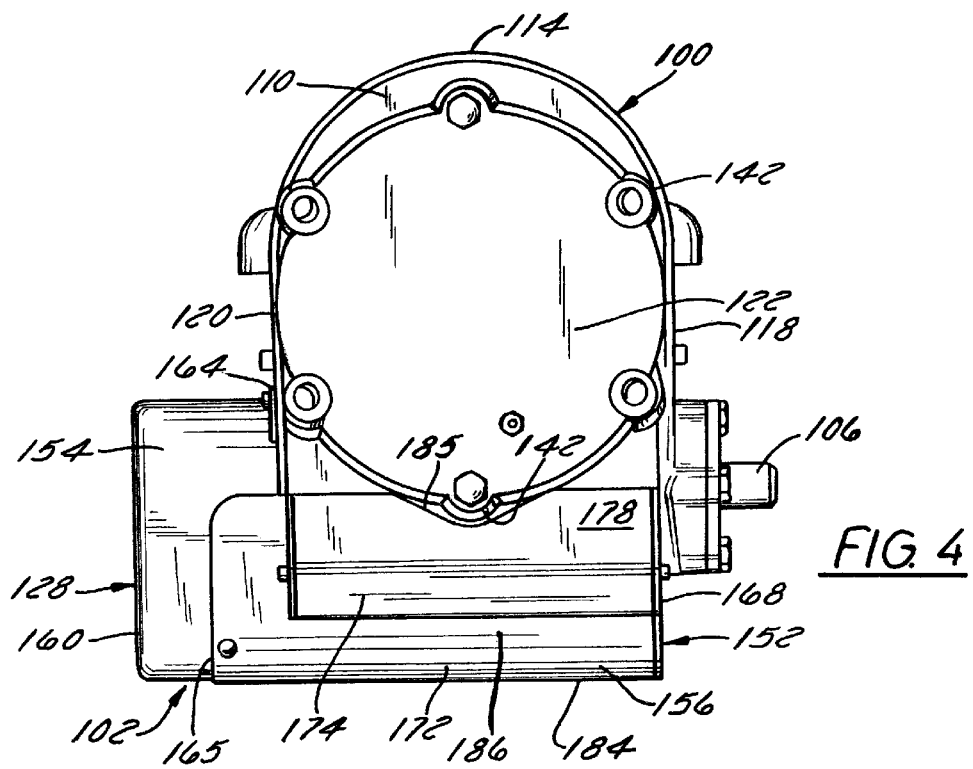
FIG. 4 is a top plan view of the gearbox assembly of FIG. 3.
Figure 9:
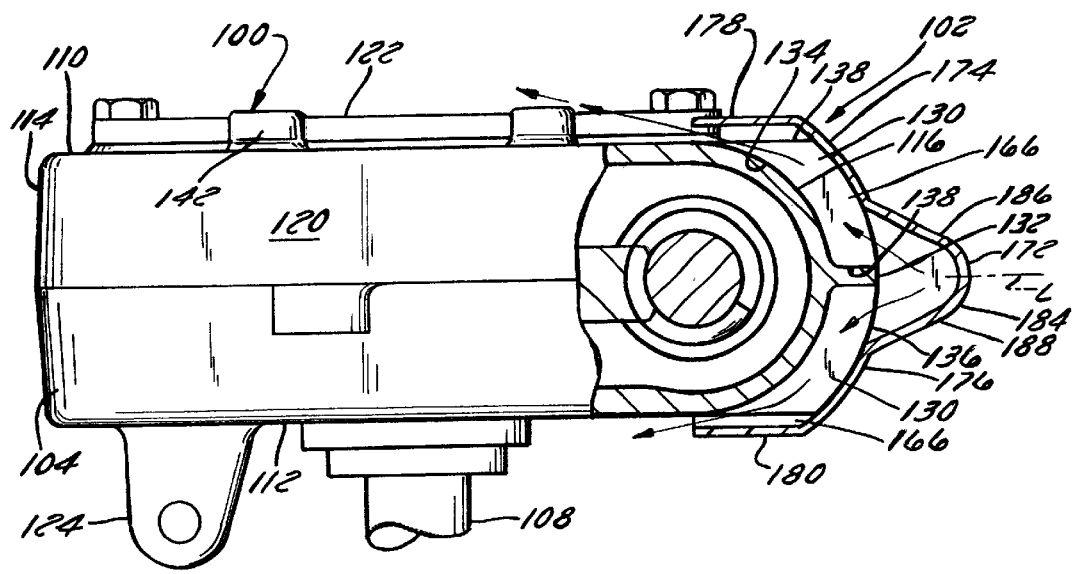
FIG. 9 is a partial fragmentary, side elevation view of the gearbox assembly, illustrating the airflow through the assembly.
Figure 10:
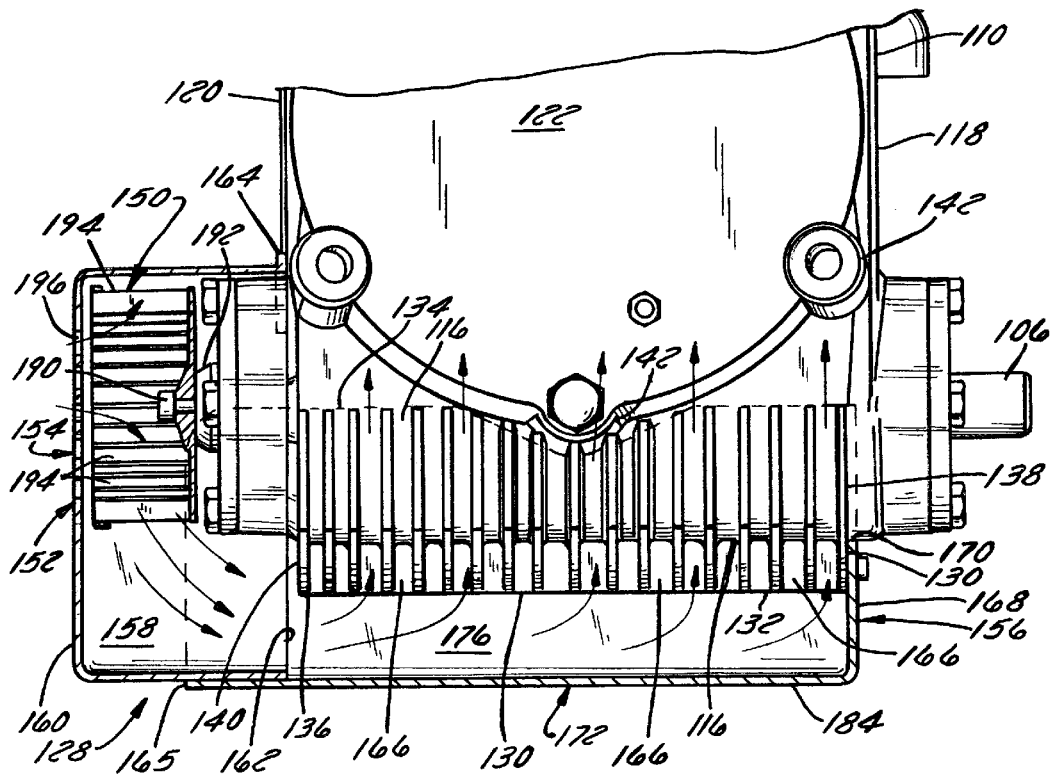
FIG. 10 is a partial fragmentary, top plan view of the gearbox assembly, illustrating the airflow through the assembly.

The air cooler 102 includes a blower 128 and a plurality of horizontally-spaced, vertically-extending fins 130. Fins 130 are cast onto the front end wall 116 of the housing 104 as best seen in FIGS. 9 and 10. The number of fins 130, their geometries, and the spacing between them likely will very from application-to-application. They preferably should be configured to maximize their ability to divert air flowing horizontally across the front end wall 116 of the housing 104 towards at least one of the upper and lower housing surfaces 110 and 112 to cool that surface. They are preferably configured to provide the same or substantially the same cooling of both surfaces 110 and 112. Hence, in the illustrated embodiment, the fins 130 are provided in upper and lower rows which meet one another at a partition 132. This partition 132 extends along a horizontal parting line L which bisects the housing 104 as best seen in FIGS. 3 and 9. The fins 130 of each row extend outwardly from the front wall 116 towards the blower 128. Each fin 130 has an inner edge 134, an outer edge 136, a planar proximal end 138 which terminates at the partition 132, and a planar distal end 140 which is essentially co-planar with an associated one of the upper housing surface 110 and the lower housing surface 112. The outer edge 136 of each fin 130 is curved from the outer end of the partition 132 to the distal end 140. The inner edge 134 of each fin 130 is formed integrally with the rear end wall 116 of the housing 104. The distal ends 140 and outer edges 136 of most fins 130 terminate at a common upper or lower edge line. However, as best seen in FIGS. 3 and 10, the distal ends 140 of a few of the fins 130 of the upper row are truncated at their inner edges so as to accommodate a mounting lug 142 for the access plate 122.

The blower is 102 configured to cool the housing 104 by interacting with the fins 130 to maximize convective heat transfer to the upper and lower surfaces 110 and 112 of the housing 104. Blower 128 includes an impeller 150 and a shroud 152. The shroud 152 houses the impeller 150 and is mounted over the front end wall 116 of the housing 104 so as to overly the fins 130. The shroud 152 may be formed from any suitable plastic material such as a vacuum formed high-density polyethylene.

Referring to FIGS. 3–10, the shroud 152 includes an outboard impeller housing section 154 and an inboard air directing section 156. The impeller housing section 154, best seen in FIGS. 3–7 and 10, has a hollow interior 158, an outboard end 160, an open inboard end 162, and a flange 164 which is bolted to the outboard sidewall 120 of the housing 104. The air directing section 156 of shroud 152 extends horizontally across the front end wall 116 of the gearbox housing 104 and overlies the fins 130 so as to form airflow passages 166 between the fins 130 and the shroud 152. It has an outboard end 165 attached to the inboard end 162 of the impeller housing section 154. It also has an inboard end that terminates at a wall 168 that is bolted to the inboard sidewall 118 of housing 104 by bolts (not shown). The wall 168 abuts the inboard-most fin on the gearbox housing 104 so as to prevent air flowing through the shroud 152 from short-circuiting the airflow passages 166. It also has an arcuate notch 170 formed therein that accommodates the input shaft 106.

The air directing section 156 of the shroud 152, best seen in FIGS. 3–6 and 8–10, is configured to direct substantially all air flowing through it vertically through the airflow passages 166 without inhibiting airflow into the passages 166. It is also symmetrical about the parting line L so as to aid in the equal diversion of airflow over both the upper and lower surfaces 110 and 112 of the gearbox housing 104. Toward these ends, the air directing section 156 includes a duct portion 172, upper and lower directing portions 174, 176, and upper and lower discharge portions 178, 180. The inboard ends of all three portions collectively form the inboard end wall 168. The outboard portions of the directing portions 174, 176 and discharge portions 178, 180 form a common end wall 182 that is spaced from the outboard end of the duct portion 172 so as not to interfere with connection of the impeller housing section 154 to the air directing section 156. The common end wall 182 is also bolted to the outboard-most fin 130 to prevent air from short-circuiting the airflow passages 166.

The duct portion 172 has an open outboard end, a closed inboard end wall, and a generally U-shaped sidewall. The sidewall has an outer end portion 184 flanked by upper end lower side legs 186 and 188. The outer end portion 184 is bisected by the parting line L and is spaced from the outer end of the partition 132 by a substantial amount, thereby permitting uninhibited airflow horizontally past the partition 132 as best seen in FIGS. 9 and 10. The upper and lower sides legs 186 and 188 are curved so as to aid in the direction of air towards the airflow passages 166 formed between the fins 130.

The upper and lower directing portions 174 and 176 extend inwardly away from respective edges of duct portion 172. They also are curved so as to lie closely adjacent to the outer edges 136 of the fins 130 as best seen in FIG. 9. As a result of this configuration, each of the airflow passages 166, when viewed in transverse cross-section, has an inner wall formed by the front end wall 116 of the gearbox housing 104, opposed sidewalls formed by a pair of adjacent fins 130, and an outer wall formed by a respective air directing portion 174 or 176.

Each of the upper and lower discharge portions 178 and 180 extends from a respective one of the upper and lower air directing portions 174 and 176 to an air outlet formed from an open face of the shroud disposed inwardly of the of the inner edges 134 of the fins 130. Each of the discharge portions 178 and 180 extends at least generally parallel to a respective one of the upper and lower housing surfaces 110 and 112. In addition, each of the discharge portions 178 and 180 is spaced from the associated housing 110 or 112 surface by a gap dimensioned to direct air from the passages 166 generally horizontally along the housing surface as best seen in FIG. 9. The inner edge of the upper discharge portion 178 is notched at a central portion 185 thereof to accommodate one of the mounting lugs 142 for the access plate 122.

The impeller 150 may comprise any suitable mechanism for forcing air into downstream portions of the shroud 152. As best seen in FIGS. 5, 7, and 10, the illustrated impeller 150 comprises an axial-inlet, radial outlet impeller that is housed in the impeller housing section 154 of the shroud 152. It is mounted on an extension 192 of the input shaft 106 by a bolt 190 so as to rotate with the input shaft 106. A plurality of circumferentially-spaced blades 194 draw air through apertures 196 in the outboard end wall 160 of the impeller housing section 154 into an open axial end of the impeller 150. The air then flows radially outwardly from the impeller 150 and into the air-directing section 156 of the shroud 152.

4. Operation of Finishing Machine

In use, the engine 72 is controlled to transfer torque to the input shafts 106 of the gearbox assemblies via the torque transfer system 74. The output shafts 108 of the gearbox assemblies 52 then transfer this torque to the driven shafts 54 of the rotor assemblies 28, 30 to rotate the blades 56 to smooth the concrete surface. The operator tilts the gearbox assemblies 52 during this operation to effect the desired steering control. He also tilts the blades 56 relative to the gearboxes 100 to effect the desired blade pitch control.

Each gearbox 100 is cooled during this operation by operation of its dedicated air cooler 102. Specifically, the impeller 150 rotates with the input shaft 106 to draw air into the impeller housing section 154 of the shroud 152 and to discharge that air into the air directing section 156. The air flows horizontally through the duct portion 172 but is prevented from short-circuiting the airflow passages 166 because the shroud 152 is seated on the endmost fins 130. The air is therefore is deflected vertically through the passages 166 and over and under the housing 104, thereby maximizing convective heat transfer with the upper and lower surfaces 110 and 112 of the housing 104. This considerably enhances cooling when compared to an arrangement in which air flows past only the end wall of a housing, both because a greater percentage of the housing's surface area is subjected to convective heat transfer and because the lubricant collects on the lower surface 112 of the housing 104 and, accordingly, is most effectively cooled when the lower surface 112 of the housing is cooled. The gearbox assembly's thermal capacity therefore is considerably enhanced. A smaller, lighter, and less-expensive gearbox 100 can therefore be used in a given application without fear of overheating. Indeed, in the riding finishing trowel application described in this example, it has been discovered that a gearbox 100 weighing only 43 lbs can be used in a system that is rated for a gearbox output speed of 200 rpm at input speed of 4,000 rpm by a 10–15 hp input. In contrast, a comparable previously-available system lacking the inventive air cooler 102 required a gearbox weighing over 70 lbs despite the fact that it was rated for a maximum speed of only 150 rpm.

Many changes and modifications could be made to the invention without departing from the spirit thereof. Some of these changes are discussed above. Other changes will become apparent from the appended claims.

I claim:

1. An air-cooled gearbox assembly comprising:
   (A) a gearbox which includes an input shaft, an output shaft, and a housing, said housing having upper and lower surfaces, an end wall which extends between said upper and lower surfaces, and outboard and inboard sidewalls which flank said end wall; and
   (B) a cooler comprising a blower and a plurality of spaced fins which are disposed on said end wall of said housing, said cooler being configured to deflect air flowing along said end wall of said housing over at least one of said upper and lower surfaces of said housing, wherein said blower comprises an impeller and a shroud which encases said impeller and which overlies said fins, said shroud and said fins forming air flow passages that extend between said fins to said at least one of said upper and lower surfaces of said housing.

2. A gearbox assembly as recited in claim 1, wherein said shroud has inboard and outboard ends which seat against a fin disposed near said inboard and outboard sidewalls of said housing so as to prevent air flowing through said shroud from short-circuiting said airflow passages.

3. A gearbox assembly as recited in claim 1, wherein said shroud includes A) a duct portion which extends across said end of said housing and B) an air directing portion which overlies at least some of said fins so as to form said airflow passages, each of said airflow passages, when viewed in transverse cross-section, having an inner wall formed by said end wall of said housing, opposed sidewalls formed by a pair of adjacent fins, and an outer wall formed by said air directing portion of said shroud.

4. A gearbox assembly as recited in claim 3, wherein each of said fins has an inner edge which is formed integrally with said end wall of said housing and an arcuate outer edge, and wherein said air directing portion of said shroud is disposed closely adjacent said fins and has a curvature that generally matches a curvature of said outer edges of said fins.

5. A gearbox assembly as recited in claim 4, wherein said shroud further comprises a discharge portion which is generally parallel to and partially overlies said at least one surface of said housing and which extends from said air directing portion of said shroud to an open face of said shroud.

6. A gearbox assembly as recited in claim 1, wherein
   said fins include upper and lower rows of fins, wherein the fins of each row extend vertically from a horizontal parting line towards a respective one of said upper and lower surface of said housing, and wherein
   said shroud and said fins are generally symmetrical about said parting line so as to direct air generally equally over both of said upper and lower surfaces of said housing.

7. A gearbox assembly as recited in claim 1, wherein said shroud is mounted on said housing.

8. A gearbox assembly as recited in claim 1, wherein the gearbox weighs less than 50 lbs and is rated for a gearbox output speed of 200 rpm at an input speed of 4,000 rpm by a 10–15 hp input.

9. A gearbox assembly comprising:
   (A) a gearbox which includes an input shaft, an output shaft, and a housing, said housing having upper and lower surfaces, an end wall which extends between said upper and lower surfaces, and outboard and inboard sidewalls which flank said end wall, said input shaft extending into one of said sidewalls of said housing, and said output shaft extending out of said lower surface of said housing; and
   (B) a cooler comprising
      (1) upper and lower rows of spaced fins, wherein the fins of each row extend outwardly from said end wall and which extend vertically from a horizontal parting line on said end wall towards said upper and lower surfaces of said housing, and
      (2) a blower which is mounted on said housing and which includes an impeller and a shroud which houses said impeller and which overlies said fins, wherein said shroud includes a) a duct portion which extends generally horizontally across said end wall of said housing and b) an air directing portion which extends away from upper and lower edges of said duct portion and which overlies said fins so as to form airflow passages extending from said duct portion to said upper and lower surfaces of said housing, wherein each of said airflow passages, when viewed in transverse cross-section, has an inner wall formed by said end wall of said housing, opposed sidewalls formed by a pair of adjacent fins, and an outer wall formed by said air directing portion of said shroud, and wherein said shroud has an inboard end which seats against fins disposed near said inboard and outboard sidewalls of said housing so as to prevent air flowing through said duct portion from short-circuiting said airflow passages.

10. A gearbox assembly comprising:
(A) a gearbox which includes an input shaft, an output shaft, and a housing, said housing having upper and lower surfaces, an end wall which extends between said upper and lower surfaces, and outboard and inboard sidewalls which flank said end wall, said input shaft extending into one of said sidewalls of said housing in the vicinity of said end wall, and said output shaft extending out of said lower surface of said housing; and
(B) a cooler comprising
  (1) upper and lower rows of spaced fins, wherein the fins of each row extend outwardly from said end wall and which extend vertically from a horizontal parting line that bisects said end wall towards said upper and lower surfaces of said housing, each of said fins being cast integrally with said end wall of said housing at its inner edge and having an arcuate outer edge,
  (2) a blower which is mounted on said housing and which includes a) an impeller and b) a shroud which houses said impeller, which extends across said end wall of said housing so as to overly said fins so as to form airflow passages between said fins and said shroud, and which is bisected by said by said parting line, wherein said shroud has outboard and inboard ends which seat against fins disposed near said outboard and inboard sidewalls of said housing so as to prevent air flowing through said shroud from short-circuiting said airflow passages, wherein said shroud includes
    (a) a duct portion which extends generally horizontally across said end wall of said housing and which is bisected by said parting line,
    (b) upper and lower arcuate air directing portions, each of which extends away from a respective one of an upper edge and a lower edge of said duct portion, which is disposed closely adjacent one of said upper and lower rows of fins so as to form said airflow passages, and which has a curvature that generally matches a curvature of said outer edges of said fins, wherein each of said airflow passages, when viewed in transverse cross-section, has an inner wall formed by said end wall of said housing, opposed sidewalls formed by a pair of adjacent fins, and an outer wall formed by a respective air directing portion of said shroud, and
    (c) upper and lower discharge portions each of which extends generally in parallel with a respective one of said upper and lower surfaces of said housing and which extends from a respective one of said upper and lower air directing portions to an air outlet formed from an open face of said shroud.

11. A method of cooling a gearbox, said gearbox comprising an input shaft, an output shaft, and a housing, said housing having upper and lower surfaces, an end wall which extends between said upper and lower surfaces, and outboard and inboard sidewalls which flank said end wall, said method comprising:
(A) forcing air generally horizontally across said end wall of said housing; and
(B) deflecting at least a substantial portion of said air generally vertically along said end wall and onto at least one of said upper and lower surfaces, thereby cooling said at least one surface, wherein the deflecting step comprises deflecting the air at least one of upwardly and downwardly from a horizontal parting line on said end wall and over at least one surface.

12. A method as recited in claim 11, further comprising substantially preventing air from flowing horizontally past said inboard sidewall of said housing.

13. A method as recited in claim 11, wherein the deflecting step is performed by a shroud which directs air between fins on said end wall and over said at least one surface of said housing.

14. A method as recited in claim 13, wherein the deflecting step comprises directing air from a duct portion of said shroud into airflow passages, said airflow passages being bordered by said end wall of said housing, by said fins, and by an air directing portion of said shroud which is disposed closely adjacent said fins.

15. A method as recited in claim 14, wherein air is discharged from said directing passages in generally horizontal streams that extend generally perpendicularly from said end wall.

16. A concrete finishing machine comprising:
(A) a mobile frame;
(B) a rotor assembly which is supported on said frame and which includes a driven shaft and a plurality of trowel blades attached to and extending outwardly from said driven shaft so as to rest on a surface to be finished and to rotate with said driven shaft to finish a circular area;
(C) a power source which is supported on said frame and which is coupled to a rotatable drive shaft; and
(D) a torque transfer system which transfers torque from said drive shaft to said driven shaft, said torque transfer system comprising an air-cooled gearbox assembly including
  (1) a gearbox which includes an input shaft which is coupled to said drive shaft, an output shaft which forms said driven shaft, and a housing, said housing having upper and lower surfaces, an end wall which extends between said upper and lower surfaces, and outboard and inboard sidewalls which flank said end wall, and
  (2) a cooler comprising a) a blower and b) a plurality of spaced fins disposed on said end wall of said housing, said cooler being configured to deflect air flowing generally horizontally along said end wall of said housing vertically onto and over at least one of said upper and lower surfaces of said housing, wherein said blower comprises an impeller and a shroud which encases said impeller and which overlies said fins, said shroud and said fins forming airflow passages that extend between said fins to said at least one of said upper and lower surfaces of said housing.

17. A concrete finishing machine as recited in claim 16, wherein said shroud has an inboard end which seats against a fin disposed near said inboard sidewall of said housing so as to prevent air flowing through said shroud from short-circuiting said airflow passages.

18. A concrete finishing machine as recited in claim 16, wherein said shroud includes A) a duct portion which extends generally horizontally across said end wall of said housing and B) an air directing portion which overlies at least some of said fins so as to form said airflow passages, wherein each of said airflow passages, when viewed in transverse cross-section, has an inner wall formed by said end wall of said housing, opposed sidewalls formed by a pair of adjacent fins, and an outer wall formed by said air directing portion of said shroud.

19. A concrete finishing machine as recited in claim 16, wherein said fins include upper and lower rows of fins, wherein the fins of each row extend vertically from a horizontal parting line towards a respective one of said upper and lower surface of said housing, and wherein said shroud and said fins are generally symmetrical about said parting line so as to direct air at least generally equally over both of said upper and lower surfaces of said housing.

* * * * *